US008379972B1

(12) United States Patent
Wang et al.

(10) Patent No.: US 8,379,972 B1
(45) Date of Patent: Feb. 19, 2013

(54) COLOR DECONTAMINATION FOR IMAGE COMPOSITING

(75) Inventors: Jue Wang, Seattle, WA (US); Sarah Kong, Cupertino, CA (US); Alan L. Erickson, Highlands Ranch, CO (US)

(73) Assignee: Adobe Systems Incorporated, San Jose, CA (US)

( * ) Notice: Subject to any disclaimer, the term of this patent is extended or adjusted under 35 U.S.C. 154(b) by 522 days.

(21) Appl. No.: 12/628,322

(22) Filed: Dec. 1, 2009

(51) Int. Cl.
*G06K 9/00* (2006.01)
(52) U.S. Cl. .......................................... 382/162
(58) Field of Classification Search .................. None
See application file for complete search history.

(56) References Cited

U.S. PATENT DOCUMENTS

| | | | | |
|---|---|---|---|---|
| 5,355,174 A * | 10/1994 | Mishima | ....................... | 348/592 |
| 5,475,507 A * | 12/1995 | Suzuki et al. | ................ | 358/500 |
| 6,038,031 A * | 3/2000 | Murphy | ....................... | 382/254 |
| 6,128,046 A * | 10/2000 | Totsuka et al. | ................ | 348/590 |
| 6,134,345 A * | 10/2000 | Berman et al. | ................ | 382/162 |
| 6,243,070 B1 * | 6/2001 | Hill et al. | ....................... | 345/589 |
| 6,456,394 B1 * | 9/2002 | Gwaltney et al. | ............. | 358/1.9 |
| 6,496,599 B1 * | 12/2002 | Pettigrew | ....................... | 382/162 |
| 6,701,009 B1 * | 3/2004 | Makoto et al. | ................ | 382/164 |
| 6,721,446 B1 * | 4/2004 | Wilensky et al. | ............. | 382/162 |
| 6,839,463 B1 * | 1/2005 | Blake et al. | ....................... | 382/173 |
| 6,999,100 B1 * | 2/2006 | Leather et al. | ................ | 345/611 |
| 7,006,109 B2 * | 2/2006 | Toji et al. | ....................... | 345/613 |
| 7,013,043 B2 * | 3/2006 | Kashioka | ....................... | 382/167 |
| 7,015,926 B2 * | 3/2006 | Zitnick et al. | ................ | 345/592 |
| 7,317,826 B2 * | 1/2008 | Wilensky et al. | ............. | 382/162 |
| 7,974,467 B2 * | 7/2011 | Kaku et al. | ....................... | 382/167 |
| 2006/0028473 A1 * | 2/2006 | Uyttendaele et al. | ......... | 345/473 |
| 2006/0028489 A1 * | 2/2006 | Uyttendaele et al. | ......... | 345/646 |
| 2007/0165966 A1 * | 7/2007 | Weiss et al. | ................ | 382/284 |
| 2007/0200938 A1 * | 8/2007 | Kaku et al. | ................ | 348/239 |

OTHER PUBLICATIONS

A. Levin D. Lischinski and Y. Weiss. A Closed Form Solution to Natural Image Matting. IEEE Trans. Pattern Analysis and Machine Intelligence, Feb. 2008.
Alexandru Telea. An Image Inpainting Technique Based on the Fast Marching Method. Journal of Graphics Tools, vol. 9, No. 1, 25-36, 2004.

* cited by examiner

*Primary Examiner* — Samir Ahmed
(74) *Attorney, Agent, or Firm* — Wolfe-SBMC

(57) ABSTRACT

Various embodiments of methods and apparatus for removing unwanted background color from a border region surrounding a foreground object in an image in order to composite the foreground object of the image with a new background image are described. Embodiments of color decontamination for image compositing may accept an image and an alpha matte corresponding to the image as input. In some embodiments, estimated foreground colors are determined for pixels in a border region between the foreground and the background of the input image. In some embodiments, the input image may be created by down-sampling a higher resolution image and pixels with estimated foreground colors may be up-sampled. In some embodiments, a composite image may be created based on the input image, the alpha matte, the estimated foreground colors of pixels in the border region and a new background image. In some embodiments, a texture preserving luminance blending operation may be performed using the estimated foreground colors for pixels in the border region to create refined foreground colors for pixels in the border region. In some embodiments, a composite image may be created further based on the refined foreground colors for pixels in the border region. In some embodiments, parameters controlling the creation of a composite image may be set in response to user input.

20 Claims, 9 Drawing Sheets

COLOR DECONTAMINATION FOR IMAGE COMPOSITING

BACKGROUND

With advances in digital imaging systems, using matting techniques to create novel composites or to facilitate other editing tasks has gained increasing interest from both professionals as well as consumers. Matting refers to the problem of accurate foreground extraction from images and video. Specifically, an observed image may be modeled as a convex combination of a foreground image and a background image, using alpha values in an alpha matte as interpolation coefficients. The alpha matte may be used as a soft mask to apply a variety of object-based editing functions. In particular an alpha matte may be used to separate a foreground object from the background of an input image. An input image I, as depicted in FIG. 1A, may be modeled as a linear combination of a foreground image F and a background image B using alpha matte a:

$$I = \alpha \cdot F + (1-\alpha) \cdot B$$

FIG. 1B illustrates an alpha matte corresponding to the lion in the foreground of the image of FIG. 1A. The alpha matte contains an alpha value corresponding to each pixel of the input image. For example, the maximum $\alpha$ value for a pixel may be 1, meaning that the pixel is fully occupied by the foreground. The minimum value may be 0, meaning that the pixel is not covered by the foreground at all. An $\alpha$ value between 0 and 1 may indicate that the pixel is semi-transparent, meaning that the foreground and the background both contribute to the appearance (e.g. color) of the pixel.

Using an alpha matte to compose a foreground object from a first image onto a second background image may result in undesirable color from the background of the first image appearing in the composite image with the second background. For example, composing an image with the lion from the foreground of FIG. 1A onto the background of FIG. 1C may begin with the pixels representing the lion. These pixels are obtained by multiplying the alpha matte for the foreground object (i.e. the lion) with the image I. Mathematically, this is represented as $\alpha I$. Using the equation above with $\alpha I$ as the foreground and the new background (represented as $B_2$) gives a formula for the composite image $I_2$:

$$I_2 = \alpha I + (1-\alpha) B_2$$

Substituting the expression for I into the equation above gives:

$$I_2 = \alpha(\alpha F + (1-\alpha)B) + (1-\alpha)B_2 = \alpha^2 F + \alpha(1-\alpha)B + (1-\alpha)B_2$$

For a pixel with an alpha matte value of 1, meaning that the pixel is completely a foreground pixel, $\alpha^2$ is 1 and $(1-\alpha)$ is 0. The entire contribution to the final image thus comes from the term $\alpha^2 F$. For a pixel with an alpha matte value of 0, meaning that the pixel is entirely a background pixel, the term $\alpha(1-\alpha)B$ has a value of 0 so the entire contribution to the pixel is from the background $B_2$. However, for pixels with an alpha matte value between 0 and 1 neither $\alpha$ nor $(1-\alpha)$ has a value of 0 and there is a contribution to the final image $I_2$ from both B and $B_2$.

FIG. 1D illustrates the visual effect of the $\alpha(1-\alpha)B$ term in an image. The dark line along the edge of the lion's mane in the enlarged portion of FIG. 1D represents pixels that may have a color contribution from the background of FIG. 1A. Assuming that the background of FIG. 1A is green, the edge of the lion's mane in FIG. 1D may have a greenish tinge. This may be undesirable or unacceptable in the composite image.

One method for approximating foreground and background portions of an image using global optimization is formulated mathematically as:

$$\min \sum_{i \in I} \sum_c (\alpha_i F_i + (1-\alpha_i)B_i - I_i)^2 + |\alpha_{i_x}|((F_{i_x})^2 + (B_{i_x})^2) + |\alpha_{i_y}|((F_{i_y})^2 + (B_{i_y})^2).$$

In this formula, $F_i$ and $B_i$ represent the foreground and background colors, respectively, to be estimated for pixel i. The first term in this energy function tends to make the estimated colors satisfy the compositing function given above. When the second term, involving the horizontal derivative of $\alpha$ ($\alpha_{i_x}$) at the location of the pixel, is large then the derivatives of the foreground and background colors, $F_{i_x}$ and $B_{i_x}$, should be small. This will mean that the colors should stay smooth across an edge. The third term applies the same concept to the vertical derivatives.

The technique requires a global optimization process to solve all pixel colors simultaneously. Furthermore, the optimization process must be applied in all color channels. This process may be computationally infeasible, particularly for high resolution images with many pixels.

SUMMARY

Various embodiments of a method and apparatus for color decontamination of images for compositing are described. Given an input image and an alpha matte corresponding to the input image, embodiments of a color decontamination method may be applied to generate a composite image with a color decontaminated foreground and a new background. Pixels in a border region between a foreground object and the background of the input image may have colors partially determined by the foreground of the image and partially determined by the background. In some embodiments, the alpha matte contains values for each pixel in the image that indicate the degree of foreground and background contribution to the color of a pixel in the border region. A color decontaminated version of the input image has some or all of the background color removed from pixels in the border region. Embodiments of the methods described herein compute estimated foreground colors for pixels in the border region based on colors in the foreground of the image, on estimated colors of neighboring pixels and on alpha matte values corresponding to the pixels in the border region.

In embodiments of a color decontamination method, an input image and alpha matte corresponding to the input image may be accessed. The input image may be a digitally-captured image such as a digital photograph, a digitized image such as a digitized conventional photograph, a digital video frame, or in general any digital image. The alpha matte identifies a portion of the input image as foreground, a portion as background and a border region with pixels having colors containing a contribution from both the foreground and the background. In various embodiments, the alpha matte may be stored within the image as an alpha channel or it may be stored separately from the image.

Given the input image and the alpha matte, a band of the border region of the image may be identified. Pixels in the border region may have a foreground color estimated. The color estimated for each pixel may be based on the original color of the pixel in the input image, on estimated foreground colors for neighboring pixels, and on the alpha value corresponding to the pixel in the alpha matte. In some embodiments, the estimated color of a pixel is a combination of the pixel color in the input image and a weighted average of foreground colors and estimated foreground colors of neighbor pixels. In an embodiment, weights are computed for neighbor pixels based on the differences in color and differences in alpha values between the pixel and the neighbor pixels. The estimated foreground colors for pixels in the border region may be combined with the input image and with a new background image to create a composite image.

The input image may be down-sampled from a higher resolution image. In some embodiments, the down-sampling may be performed as an initial step in color decontamination. In other embodiments, the down-sampling may be performed prior to color decontamination. In embodiments with a down-sampled input image, the output of the color decontamination method may be up-sampled to the resolution of the input image. In some embodiments, the color decontaminated image may be up-sampled to another resolution for further processing.

A pixel-wise luminance blending operation may be applied to the color decontaminated pixels as a refinement, in some embodiments. The luminance blending operation may restore detail lost due to color decontamination or image resizing.

In some embodiments, a final image may be generated by combining the input image, the color decontaminated image and luminance blended image in various proportions with a new background image. Parameters controlling the blending may be adjusted. In an embodiment, the parameters may be provided by a user. In an embodiment, user input may be provided through a graphical user interface slider control.

Figure 1A:
FIG. 1A shows an example input image with a foreground object.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1B:
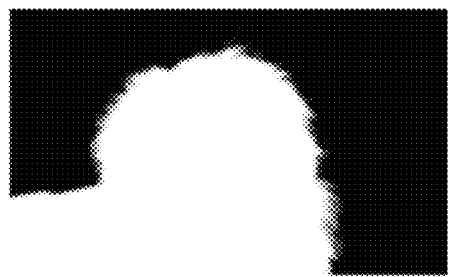
FIG. 1B shows an example alpha matte indicating the foreground object of FIG. 1A.

Various embodiments of methods and apparatus for removing unwanted background color from a border region surrounding a foreground object in an image are described. Embodiments of color decontamination for image compositing may accept an image and an alpha matte corresponding to the image as input. In various embodiments the alpha matte may be stored as an alpha channel within the image, or it may be stored separately. FIG. 1A shows an example input image. The input image may be a digitally-captured image such as a digital photograph, a digitized image such as a digitized conventional photograph, a digital video frame, or in general any digital image. FIG. 1B shows an example alpha matte corresponding to the input image. The alpha matte contains information indicating that some areas of the image are foreground (the white areas), that other areas are background (the black areas) and that some areas are transitions between foreground and background. The alpha matte of FIG. 1B identifies the lion of FIG. 1A as the foreground of the image. In FIG. 1B, at the border between the black background and white foreground areas there are areas of gray representing pixels that are transition pixels between foreground and background. In some embodiments, an alpha matte may use alpha values 0 through 1, with 1 indicating that a corresponding pixel in the image is a foreground pixel, 0 indicating that a corresponding pixel in the image is a background pixel and values between 1 and 0 indicating pixels with colors containing contributions from both the foreground and the background. Those skilled in the art will appreciate that other methods for indicating foreground and background in an image may be used with the current invention, with appropriate modifications to the example formulas described below.

Figure 1C:
FIG. 1C shows an example background image.
Figure 1D:
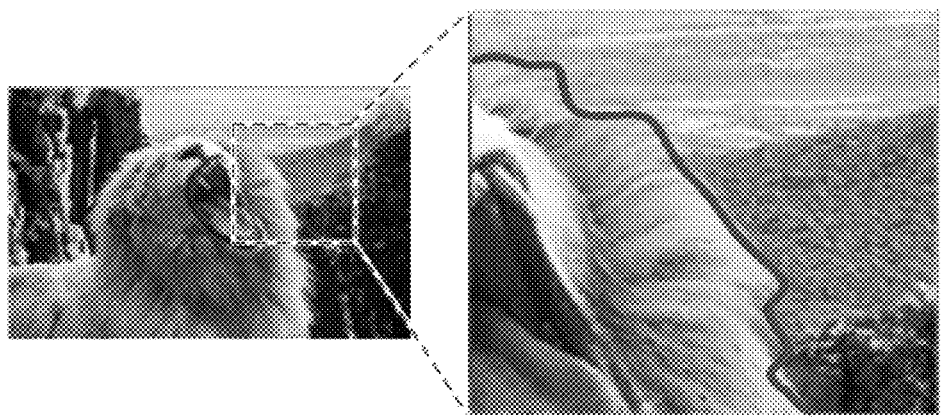
FIG. 1D shows an image with the foreground object from an example input image composited onto an example background image, with an enlarged portion of the image illustrating pixels in which color from the original background may appear.

As described above, using an alpha matte to extract a foreground image from a digital image for compositing with another background image may allow undesired information (e.g. color) from the background of the input image to appear in the final composited image. FIG. 1C illustrates an example of a new background image. FIG. 1D illustrates the use of the alpha matte of FIG. 1B to extract the image of the lion from FIG. 1A and place the extracted image onto the background image of FIG. 1C. The line along the edge of the lion's mane in the enlarged portion of FIG. 1D indicates an area in which color from the background of FIG. 1A may be seen in the composite image.

Figure 2:
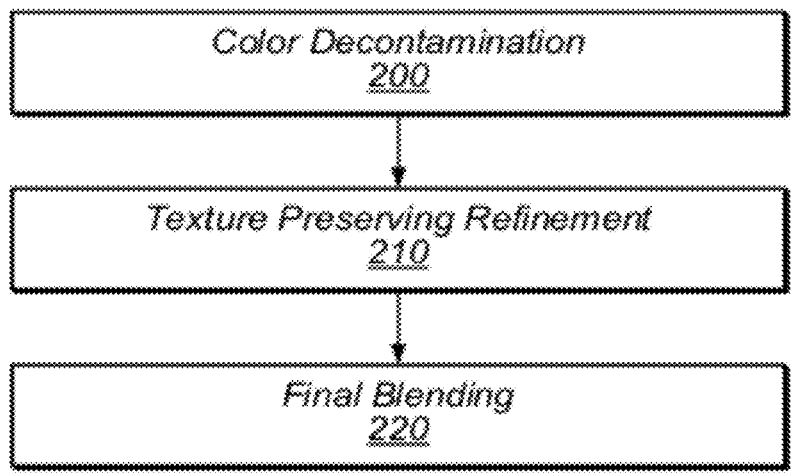
FIG. 2 illustrates a flowchart of color decontamination for image compositing, according to some embodiments.

FIG. 2 illustrates a flowchart of an embodiment of color decontamination for image compositing. Given an input image and an alpha matte corresponding to the input image, color decontamination is performed on pixels in a border region between the foreground and the background of the input image as in 200. The border region is defined by the alpha matte as described below. In some embodiments the input image may be down-sampled, color decontamination performed on the down-sampled image, and the resulting decontaminated pixels up-sampled before proceeding to the next step. After color decontamination, in some embodiments, luminance blending may be performed on pixels in the border region to recover lost detail as in step 210. Luminance blending is a texture-preserving refinement step that may be performed to compensate for blurring of the image due to resizing or other image processing operations. In step 220 a new image may be created by blending the original image, the color decontaminated pixels and the luminance blended pixels in various proportions with a new background image. In some embodiments, the contribution made by each of the original image, the decontaminated pixels and luminance blended pixels to the final image is determined by user input.

Embodiments of a color decontamination method as described herein may be implemented as or in a stand-alone application or as a module of or plug-in for a graphics application or graphics library that may provide other graphical/digital image processing tools. Embodiments may be implemented as a stand-alone command in an application, or as a pre-processing step for image processing operations such as generating composite images. Examples of types of applications in which embodiments may be implemented include, but are not limited to, scientific, medical, painting, publishing, digital photography, video editing, games, animation, and/or other applications in which digital image processing may be performed. Specific examples of applications in which embodiments may be implemented may include, but are not limited to, Adobe® Photoshop®, Adobe® Illustrator®, and Adobe® After Effects®.

Color Decontamination

Figure 3:
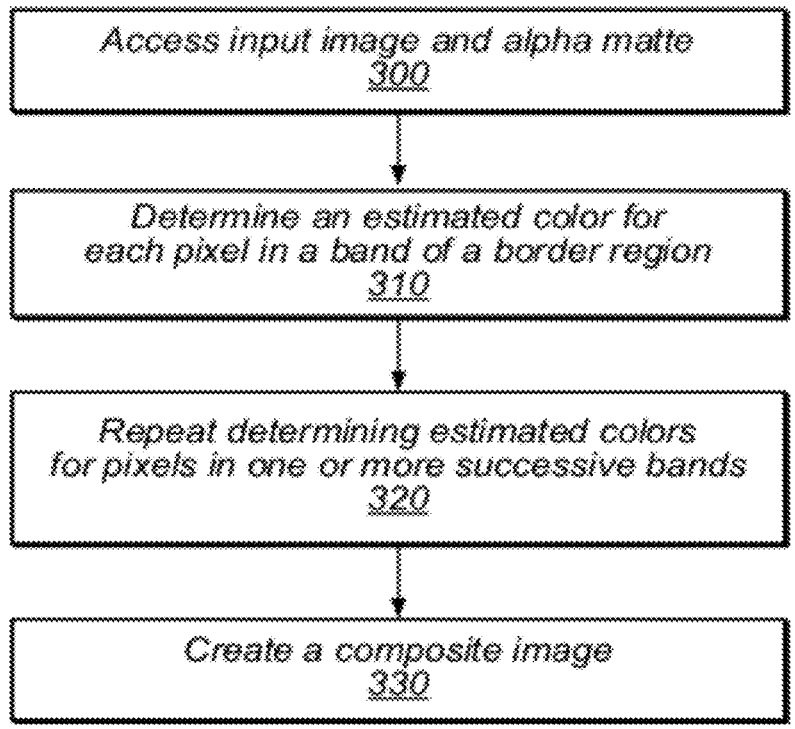
FIG. 3 illustrates a flowchart of creating a composite image using color decontamination, according to some embodiments.
Figure 4A:
FIG. 4A shows an example input image.
Figure 4B:
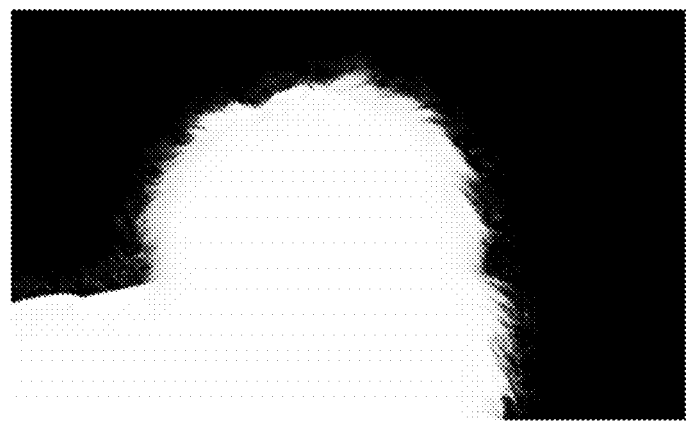
FIG. 4B illustrates an example input alpha matte corresponding to the foreground object in FIG. 4A.

FIG. 3 is a flowchart of color decontamination, as illustrated in step 200, according to some embodiments. As indicated in step 300, an input image and an alpha matte are accessed. The input image may be a digitally-captured image such as a digital photograph, a digitized image such as a digitized conventional photograph, a digital video frame, or in general any digital image. An alpha matte corresponding to an input image may be generated by an image processing application. In some embodiments the alpha matte may be generated in response to user input indicating a foreground object of interest in an image. In other embodiments, an image processing application may automatically determine a foreground object. Multiple foreground objects may be identified by an alpha matte. A sample image is illustrated in FIG. 4A. FIG. 4B illustrates an alpha matte corresponding to the image of FIG. 4A. The alpha matte in FIG. 4B identifies the lion as the foreground portion. An alpha matte identifies portions of the input image that are foreground portions, portions of the image that are background portions, and portions of the image that are a combination of foreground and background. The portions that are a combination of foreground and background may be termed transition pixels. Transition pixels form a border region between foreground and background.

Figure 4C:
FIG. 4C illustrates a border region of an image generated from the alpha matte of FIG. 4B, according to some embodiments.

In some embodiments, an alpha matte comprises alpha values. In some embodiments each pixel in an image has a corresponding alpha value in an alpha matte. In other embodiments, only a subset of pixels in an image (e.g. transition pixels) may have alpha values. The alpha values may identify foreground, background and transition pixels. In FIG. 4B, white regions indicate pixels in the image of FIG. 4A that correspond to the foreground image. In an embodiment of an alpha matte, the value in the alpha matte corresponding to the foreground pixels is 1. The black regions in FIG. 4B indicate pixels that correspond to the background portion of the image of FIG. 4A. In an embodiment of an alpha matte, the corresponding alpha matte value for pixels in the black region is 0. At the border between the foreground and background regions as shown in FIG. 4B there are pixels with a gray color. The gray pixels in FIG. 4B are the transition pixels forming the border region between the foreground and the background. The color of the transition pixels in the input image may be a combination of foreground and background as described above. In an embodiment of an alpha matte, alpha values greater than 0 and less than 1 correspond to transition pixels in the border region of the input image. Alpha values closer to 1 indicate that the color of the transition pixel has a greater contribution from the foreground of the image, while alpha values closer to 0 indicate that the color of the transition pixel has a greater contribution from the background of the image. FIG. 4C illustrates border region 410 corresponding to pixels for which the alpha values in the alpha matte of FIG. 4B have values between 0 and 1. As in FIG. 4B, the white region of FIG. 4C indicates foreground portion 420 of the image (pixels with an alpha value of 1) and the black region of the image indicates background portion 400 (pixels with an alpha value of 0). Border region 410 comprises the pixels on which color decontamination may be performed.

In some embodiments, color decontamination may continue as in step 310 by identifying a band in the border region of the image and determining an estimated foreground color for each transition pixel in the band. The band in the border region comprises pixels that are within a distance threshold of the boundary between the foreground portion of the image and the border region. The boundary is illustrated in FIG. 4C as the boundary between foreground portion 420 and border region 410. In some embodiments, the band is determined by computing the distance from each pixel in the border region to the boundary. The distance, in some embodiments, is the Euclidian distance. For example, the distance from a pixel with coordinates $(p_x, p_y)$ to a foreground pixel with coordinates $(f_x, f_y)$ may be computed as:

$$\sqrt{(p_x-f_x)^2+(p_y-f_y)^2}$$

The boundary for the foreground may be complex, as in the mane of the lion illustrated in FIG. 4A. The distance computed for each pixel in the border region may be the distance to the nearest pixel of the foreground. Methods for determining a nearest pixel to a particular pixel are well known to those skilled in the art. In the current example, a smaller distance indicates a border pixel closer to the foreground while a larger distance indicates a border pixel further from the foreground (i.e. closer to the background). The maximum distance computed for any pixel will depend on the alpha matte for a particular image. As described above the border region is determined based on values in the alpha matte. Various portions of the border region may have different maximum distance values because the width of the border region may vary, as is clearly seen in FIG. 4C. Note that the distance from a pixel to the nearest foreground pixel is not equivalent to the alpha matte value for the pixel. In some images the alpha matte value for a pixel may be correlated with the distance of a pixel to the nearest foreground pixel. However, the alpha matte value, indicating the relative contribution of foreground and background to a pixel, and the distance of a pixel to the nearest foreground pixel are distinct quantities and may not always have a clear correlation.

Figure 5:
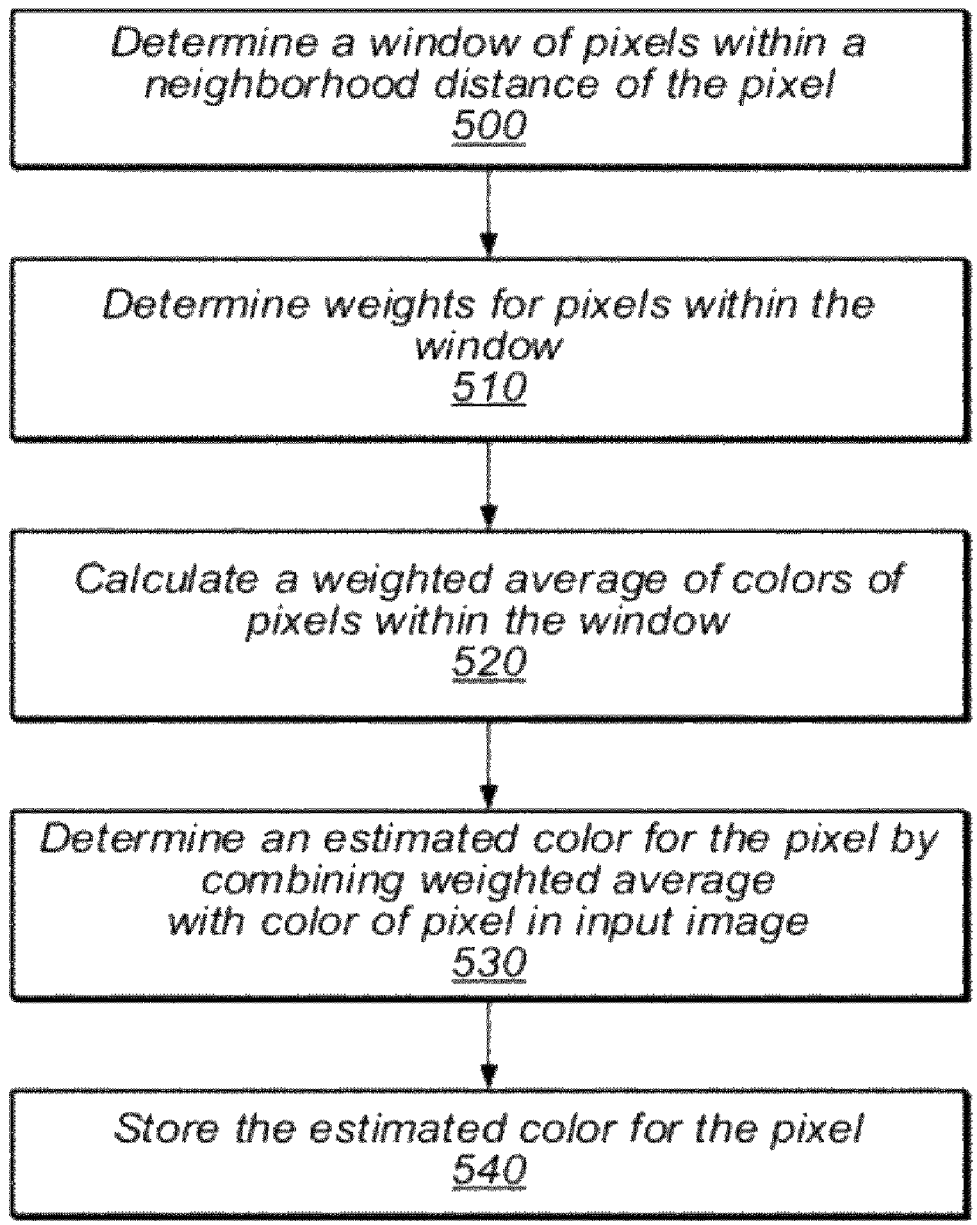
FIG. 5 illustrates a flowchart of a method for generating estimated foreground colors for pixels, according to an embodiment.
Figure 7:
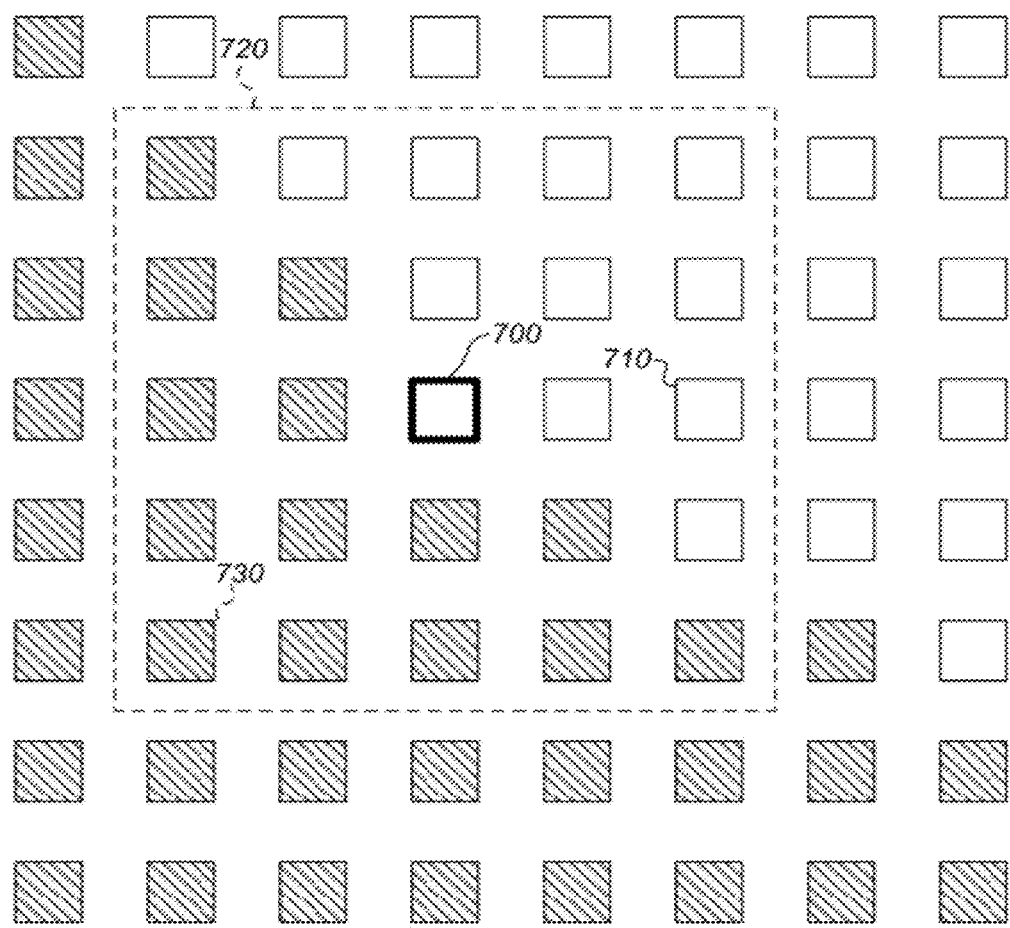
FIG. 7 illustrates pixels used in computing a weighted average the colors of neighbor pixels, according to some embodiments.

Continuing with step 310, an estimated foreground color for each pixel within the band of the border region is determined. An embodiment of a method for determining an estimated color for a selected pixel is illustrated in the flowchart of FIG. 5. In step 500 a window of neighbor pixels within a neighborhood distance of the selected pixel is determined. FIG. 7 illustrates selected pixel 700 for which an estimated foreground color is to be determined. Window 720 identifies pixels within a neighborhood distance of selected pixel 700. Pixels enclosed by window 720 that are part of the foreground (i.e. in the embodiment described above, pixels with an alpha value of 1 and illustrated as the white region of FIG. 4C) may be used to determine an estimated foreground color for pixel 700. Pixels enclosed by window 720 that are in the border region and for which estimated foreground colors have already been determined may also be used to determine an estimated foreground color for selected pixel 700. The pixels that may be used to determine an estimated foreground color for selected pixel 700 are illustrated in FIG. 7 by the shaded pixels within window 720. For example, neighbor pixel 730 may be used to calculate an estimated foreground color for selected pixel 700. Neighbor pixel 730 may be a foreground pixel (with an alpha value of 1, according to the embodiment described above) or it may be a transition pixel for which an estimated foreground color has already been determined. The open pixels within window 720, for example pixel 710, represent pixels in the border region for which estimated foreground colors have not yet been determined. These pixels may not be used in the determination of an estimated foreground color for selected pixel 700. The size of window 720 may vary according to the embodiment. In one embodiment, the width of the window is 3 pixels.

In some embodiments, as described below, a plurality of bands in the border region may be used to determine estimated foreground colors for pixels in the border region. Note that pixels used in determining an estimated foreground color for a pixel in the border region (e.g. those within window 720 as illustrated in FIG. 7) need not be in the same band. For example, pixels 700 and 730 may correspond to pixels 640 and 630 in FIG. 6. Pixels 640 and 630 are in different bands. Further, as described above, a window as illustrated in FIG. 7 may comprise pixels that are part of the foreground of the image (for example, when the window is centered on a pixel in a band near the foreground edge of the border region). Colors for foreground pixels are not estimated, but colors of foreground pixels may be used in determining an estimated foreground color for a pixel in the border region. For a pixel in the border region near the background portion of the image, a window may comprise pixels from the background portion of the image. Background pixels are not used in determining an estimated foreground color for a pixel in the border region.

Returning to FIG. 5, in step 510 a weight is calculated for each neighbor pixel within the window that will be used to determine an estimated foreground color for the selected pixel. In some embodiments, weights are based on the difference between the alpha values for the neighbor pixel and the selected pixel (that is, the difference between the alpha values corresponding to the pixels in the alpha matte) and the difference between the colors of the neighbor pixel and the selected pixel in the input image. In the illustration of FIG. 7, to calculate an estimated foreground color for pixel 700 a weight will be determined for each of the shaded pixels. For neighbor pixel 730 the weight may be based on the difference in alpha values, as indicated in the alpha matte, between neighbor pixel 730 and pixel 700, and based on the difference in color between neighbor pixel 730 and pixel 700. For an image in the RGB (red green blue) color space, in some embodiments, the weight for a pixel may in general be given by the expression:

$$W_{ij} = 1 - |\alpha_i - \alpha_j| + \varphi\left(1 - \frac{|R_i - R_j| + |G_i - G_j| + |B_i - B_j|}{3}\right)$$

In the formula above, $W_{ij}$ is the weight between selected pixel i (illustrated by pixel 700 in FIG. 7) and neighbor pixel j (illustrated by neighbor pixel 730 in FIG. 7). The terms $\alpha_i$ and $\alpha j$ are the alpha values in the alpha matte corresponding to the selected pixel and the neighbor pixel, respectively. The terms $R_i$, $G_i$, and $B_i$ represent the color of the selected pixel in the input image and the terms $R_j$, $G_j$, and $B_j$ represent the color of the neighbor pixel in the input image. $\varphi$ is an adjustable parameter. In some embodiments the value of φ may be set in response to user input, in other embodiments the value of φ may be fixed. In one embodiment the value of φ may be fixed at 0.5.

It will be clear to those skilled in the art that a weight for a selected pixel and a neighbor pixel may be computed for other color spaces in a similar fashion. The weight between a selected pixel and a neighbor pixel may be larger for pixels that have similar contributions to their colors from the foreground and background. In the embodiment described, pixels with similar foreground and background contributions have similar alpha values in the alpha matte. In the formula above, the second term comprising the absolute value of $\alpha_i - \alpha j$ will be smaller when the alpha values are similar and thus a smaller value will be subtracted from 1 to give a larger weight. The weight between a selected pixel and a neighbor pixel will also be larger when the colors of the selected pixel and the neighbor pixel are similar. In this embodiment, as indicated in the formula above, the term involving the absolute values of the differences in the red, green and blue color components will be smaller, thus the value multiplied by φ will be larger and the resulting weight will be larger.

In step 520, a weighted average of the foreground colors or estimated foreground colors of neighbor pixels is then computed in some embodiments as:

$$\hat{C}_i = \frac{\sum_j W_{ij} \cdot \hat{F}_j}{\sum_j W_{ij}}$$

In the formula above, $\hat{C}_i$, represents the weighted average of neighboring pixels for the selected pixel i for which a foreground color is to be estimated. The numerator and denominator of the fraction are sums over all of the neighbor pixels j that have foreground colors or estimated foreground colors (e.g. the shaded pixels within window 720 as illustrated in FIG. 7). The $W_{ij}$ term is the weight between the selected pixel i and neighbor pixel j, computed as described above. $\hat{F}_j$ represents the foreground color or estimated foreground color of neighbor pixel j. Note that a neighbor pixel j may have a foreground color if it is part of the foreground of the image (in the embodiment described, the pixel has an alpha value of 1) or it may have an estimated foreground color if it is part of the border region (in the embodiment described, the pixel has an alpha value between 0 and 1, and has already had an estimated color determined). A pixel may not be part of the foreground and part of the border region, thus a pixel will never have both a foreground color and an estimated foreground color.

An estimated foreground color for selected pixel i is determined as in step 530 of FIG. 5 by combining the weighted average color $\hat{C}_i$ as computed above with the color of the selected pixel in the input image $C_i$ according to the following formula:

$$\hat{F}_i = e^{-\frac{1-\alpha_i}{\sigma}} \cdot C_i + \left(1 - e^{-\frac{1-\alpha_i}{\sigma}}\right) \cdot \hat{C}_i$$

In the formula above, $\hat{F}_i$ represents the estimated foreground color calculated for the selected pixel. The symbol $\alpha_i$ represents the alpha value in the alpha matte corresponding to the selected pixel. The symbol e represents the value of the base of the natural logarithms (i.e. approximately 2.71828 . . . ), also referred to as Euler's number. The standard deviation parameter σ may be adjusted. In some embodiments, it may be adjusted in response to user input. In one embodiment, it is fixed at a value of 0.08.

The estimated foreground color for a selected pixel combines the color of the selected pixel in the input image with the weighted average color computed from neighbor pixels within a window that have foreground colors or estimated foreground colors. The combining is based on the alpha value in the alpha matte value corresponding to the selected pixel. When the value of $\alpha_i$ is close to 1, meaning that the selected pixel is primarily composed of foreground color, the pixel does not need too much color decontamination. The formula calculates the estimated foreground color to be close to the original color. When $\alpha_i$ is close to 0, the selected pixel is primarily composed of background color and the weighted average color of neighbors comprises a larger component of the determined estimated foreground color. As discussed below, the calculation of estimated colors may begin near the foreground edge of the border region, where values of $\alpha_i$ may be larger and proceeds toward the background edge of the border region where values of $\alpha_i$ may be smaller.

In step 540 of FIG. 5, the estimated foreground color for the selected pixel calculated in step 530 is stored. The steps illustrated in FIG. 5 may be repeated to calculate and store estimated foreground colors for each pixel in the band of the border.

Figure 6:
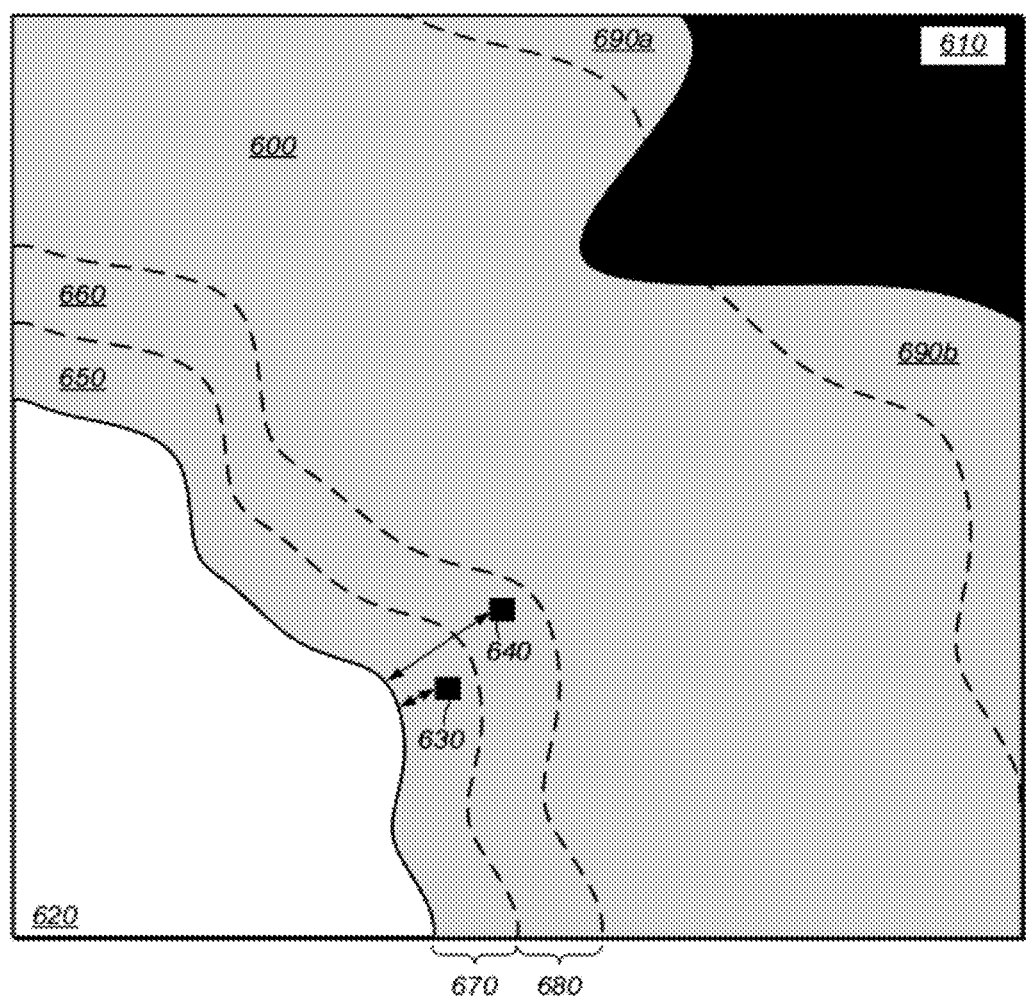
FIG. 6 illustrates determining estimated foreground colors for pixels in bands of the border region of an image, according to some embodiments.

In some embodiments, determining a band and estimating foreground colors for pixels within the band may be repeated one or more times as in step 320 of FIG. 3. Successive bands may proceed from the foreground edge of the border region to the background edge of the border region. Pixels in bands nearer to the foreground region have foreground colors estimated before pixels in bands further from the foreground region. The method is illustrated in FIG. 6. FIG. 6 illustrates an enlarged portion of a border region of an image, for example the border region illustrated in FIG. 4C. In this embodiment, colors are estimated for pixels in border region 600 in bands beginning nearer to foreground 620 and proceeding toward background 610. FIG. 6 illustrates representative pixels 630 and 640, and representative bands 650 and 660. The width of band 650 is indicated by width 670 and the width of band 660 is indicated by width 680. Pixels 630 and 640 have distances from the foreground calculated as described above. The distance calculated for pixel 630 is less than width 670 of band 650, therefore pixel 630 is in band 650. The distance computed for pixel 640, however, is greater than width 670, so pixel 640 is not part of band 650. As shown in FIG. 6 the distance of pixel 640 from foreground 620 is less than the sum of width 670 and width 680, placing pixel 640 within band 660. Estimated foreground colors will be determined for pixels in band 650, including pixel 630, before estimated foreground colors are determined for pixels in band 660, including pixel 640.

The method may be continued by determining bands further from foreground 620 than band 660 until background 610 or an edge of the image is reached. In some embodiments, bands may not be contiguous sets of pixels. The width of border region 600 may vary. For example, a band further from foreground 620 is illustrated in FIG. 6 by band portions 690a and 690b. The band is not a contiguous set of pixels, the portions being separated by a portion of background 610 which narrows border region 600. The method for determining estimated foreground colors as described above may be used for pixels in bands that are not contiguous. In some embodiments, wider portions of border region 600 may comprise more bands than narrower portions of border region 600.

In some embodiments, the widths of bands in a border region may be individually selected. In other embodiments, all of the bands may have a fixed width $\delta_d$. In such embodiments, pixels in the border region with distance values $[0, \delta_d]$ are in the band nearest the foreground. Pixels with distance values $[\delta_d, 2\delta_d]$ are in the next nearest band and so forth. In an embodiment, the value of $\delta_d$ may have a value of 1.5.

Returning to the flowchart of FIG. 3, in step 330 a new composite image is created based on the input image, the estimated foreground colors for transition pixels in the border region, the alpha matte and a new background image. In some embodiments, a new composite image may be generated using the formula:

$$I = \alpha \cdot F + (1-\alpha) \cdot B$$

In the formula above, F represents the input image with pixels in the border region replaced by corresponding pixels with estimated foreground colors computed as described above. α represents the alpha matte for the input image. B represents a new background image, and I represents the new composite image.

Color Decontamination on a Down-Sampled Image

In some embodiments, an input image and alpha matte accessed as in step 300 may be down-sampled versions of a higher resolution image and a higher resolution alpha matte. In other embodiments, down-sampling may be performed as the first step in color decontamination. Down-sampling may be desirable to reduce the processing time required for color decontamination. In some embodiments, down-sampling an image to a resolution of 512 by 512 pixels may be used. Techniques for down-sampling images are well know to those skilled in the art. In embodiments using a down-sampled input image, at least portions of the image with estimated foreground colors may be up-sampled to full resolution for further processing or storage. In some embodiments, up-sampling may be performed as a separate operation. In other embodiments, up-sampling may be performed as a step of color decontamination. Techniques for up-sampling images are also well known to those skilled in the art.

In embodiments in which an input image is down-sampled prior to color decontamination and in which further processing is performed, for example processing to implement the texture preserving refinement described below, up-sampling of the color decontaminated border region may be required to match the resolution of other versions of the image used in further processing. In some embodiments, up-sampling may generate a version of a color decontaminated image at the same resolution as the input image. In other embodiments, a color decontaminated image may be up-sampled to a different resolution.

Texture Preserving Refinement

A color decontaminated portion of an image, generated as described above, may be significantly blurred, particularly if a resizing operation was performed. Image contrast and texture information may be maintained by applying a pixel-wise luminance blending operation to the color decontaminated pixels in the border region of the image. Note that although the previous description of color decontamination was illustrated using an RGB color space, a pixel-wise luminance blending operation may be more conveniently performed using a color space with a luminance channel. Such color spaces include LAB and YUV. In embodiments using one color space for color decontamination (e.g. RGB) and a different color space for luminance blending (e.g. YUV) a suitable color space conversion of the image may be performed. Further, additional processing on an image subsequent to luminance blending may require conversions to other suitable color spaces. Such conversions are well-known to those skilled in the art and are not further described here.

The texture preserving, pixel-wise luminance blending operation may assign a new luminance value to a pixel in the border region of the image. In some embodiments, the new luminance value may be a combination of the luminance of the pixel in the input image (before down-sampling, if down-sampling was performed prior to color decontamination) and the luminance of the estimated foreground color of the pixel (after up-sampling, if color decontamination was performed on a down-sampled image). The luminance blending operation is expressed mathematically by the formula:

$$L_i^* = e^{-\frac{1-\alpha_i}{\sigma}} \cdot L_i + \left(1 - e^{-\frac{1-\alpha_i}{\sigma}}\right) \cdot \hat{L}_i$$

In the formula above, $L_i$ represents the luminance of a pixel in the input image. $\hat{L}_i$ represents the luminance of the estimated foreground color of the pixel determined in the color decontamination process described previously. As in the formula for color decontamination, the symbol e represents the value of the base of the natural logarithms (i.e. approximately 2.71828 . . . ). $\alpha_i$ represents the alpha value corresponding to the pixel in the alpha matte for the image. In some embodiments the standard deviation parameter σ may be adjusted. In one embodiment, it is fixed at a value of 0.08. In a manner similar to calculating an estimated foreground color, the computed luminance for a pixel mixes the luminance of the color of the pixel in the input image with the luminance of the estimated foreground color of the pixel, which was computed from neighboring pixels based on the alpha value corresponding to the pixel in the alpha matte. When the value of $\alpha_i$ is close to 1, meaning that the selected pixel in the input image is primarily composed of foreground color, the computed luminance of the pixel is closer to the luminance of the pixel in the input image. When $\alpha_i$ is close to 0, the selected pixel in the input image is primarily composed of background color and the computed luminance comprises a larger component of the luminance of the determined estimated foreground color.

In some embodiments, after applying a pixel-wise luminance blending texture preserving refinement the image, or portions of the image, may be stored for use in further processing.

Final Blending

In some embodiments, a final version of the color decontaminated image may be generated by combining the input image (i.e. the image prior to any down-sampling or other processing), the estimated foreground colors of pixels in the border region after color decontamination has been applied (up-sampled, if required, to the same resolution as the input image) and the colors of pixels in the border region after the pixel-wise luminance blending operation. In an embodiment, the blending operation may be described mathematically as a combination of three versions of the image:

$$C_{final} = (1-\theta)C + \theta \cdot [(1-\beta)\hat{C} + \beta \cdot C^*]$$

In the formula above, C represents the input image. $\hat{C}$ represents the input image with the colors of the pixels in the border region replaced with the estimated foreground colors computed as described previously. $C^*$ represents the input image with the colors of pixels in the border region replaced by the colors resulting from the luminance blending texture preserving refinement described previously. The contribution of each version of the image to the final image $C_{final}$ is controlled by the parameters β and θ. In the embodiment illustrated, both β and θ may vary from zero to one. Parameter θ controls the ratio of input image C to the processed images (i.e. the color decontaminated and luminance blended images) in the final image. When θ is small, near 0, the input image C provides a greater contribution to the final image $C_{final}$ and the color decontaminated and luminance blended images provide a lesser contribution. When θ is larger, near 1, contributions are reversed and C provides a lesser contribution and the processed images $\hat{C}$ and C* provide a greater contribution to the final image $C_{final}$.

The parameter β sets the ratio of $\hat{C}$, the color decontaminated version of the image, and C*, the luminance blended version of the image, in the final image $C_{final}$. In the embodiment illustrated, a small value of β, near zero, causes more of the color decontaminated version of the image to be blended into the final image $C_{final}$. When β=0, no luminance blending is included in the final image. A larger value of β, near one, causes more of the luminance blended version of the image to be included. When β=1, the maximum amount of the luminance blended version of the image is included in the final image.

Those skilled in the art will appreciate that other means for blending images to create a final image may be used. For example, in some embodiments the proportions of each image to the final image may be fixed. In other embodiments, the input image, color decontaminated version of the image, and the luminance blended version of the image may be blended using a formula having a separately adjustable parameter for each image. The final blending operation may be combined with other image processing or display operations. In some embodiments the contribution to the final image of each of the input image, color decontaminated version of the image, and the luminance blended version of the image to the final image may vary in different areas of the image.

Controlling the Final Blending

Figure 8A:
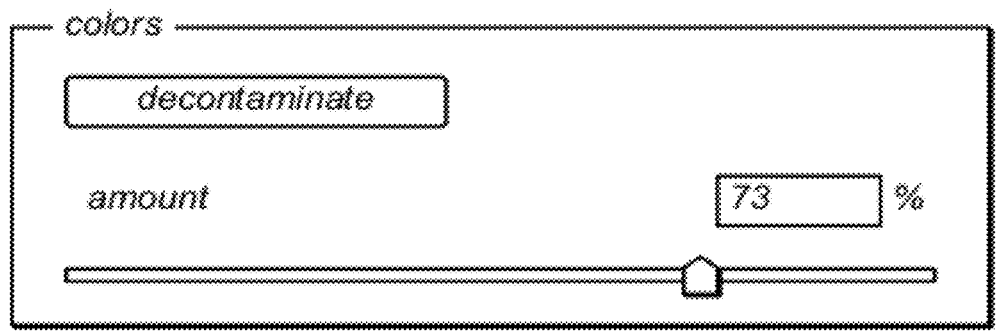
FIG. 8A illustrates a user interface element for controlling image blending parameters, according to some embodiments.

In some embodiments of color decontamination for image compositing, the parameters β and θ that adjust the contributions of the various versions of an image to a final version of the image may be set in response to user input. In one embodiment, the values of β and θ may be controlled by a single slider as illustrated in FIG. 8A. Adjusting the slider sets values of both β and θ. In an embodiment, one half of the slider range corresponds to the maximum value of β while θ varies from a minimum to a maximum value. The other half of the slider range corresponds to the maximum value for θ while β varies from a minimum value to a maximum value. For example, let the position of the slider be represented by the variable x. Then the values of β and θ may be given, in some embodiments, as:

$$\begin{cases} \theta = \frac{x}{0.5}, \beta = 1 & 0 \le x < 0.5 \\ \theta = 1, \beta = 2*(1-x) & 0.5 < x \le 1 \end{cases}$$

Figure 8B:
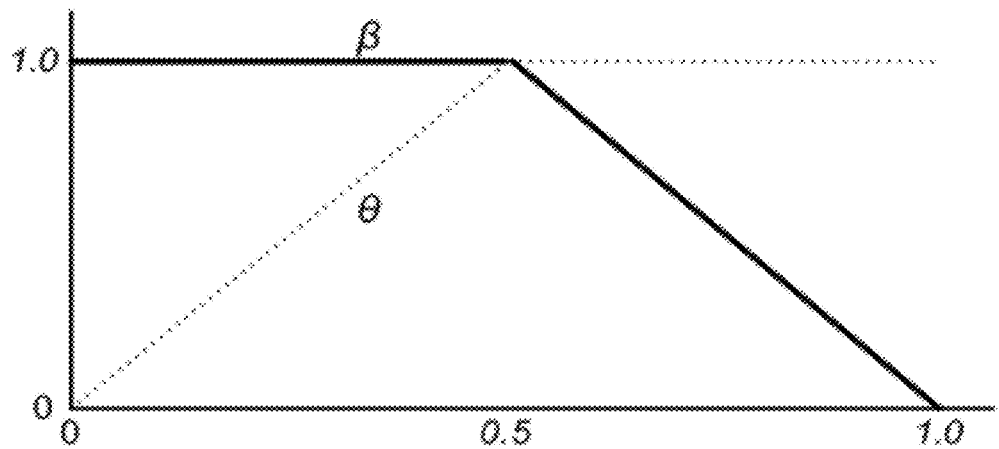
FIG. 8B illustrates the values of image blending parameters according to the operation of a user interface element, according to some embodiments.

FIG. 8B illustrates a graph of the values of β and θ as functions of x. When x is less than 0.5 in this embodiment, meaning that the slider is the left half of its range, β has a value of 1. Thus, according to the formula for $C_{final}$ given above, the contribution to the final image from the luminance blended pixels is set to the maximum amount and there is no contribution to the final image directly from the color decontaminated pixels. The ratio of luminance blended image to original image varies from 0 to 1 as the value of the variable x (representing the slider position) varies from 0 to 0.5. In the right half of the slider range, corresponding to values of x greater than 0.5 in this embodiment, θ has a value of 1 meaning that there is no contribution in the final image directly from the input image C. The value of β varies from 1 to 0 as the value of the variable x varies from 0.5 to 1. The final image $C_{final}$, according to the formula given above, is composed from only the color decontaminated and luminance blended versions of the image.

In some embodiments, $C_{final}$ as described above may be combined with a new background image to create a composite image in a fashion similar to that described previously. In an embodiment, combining a final blended image with a new background image may be described mathematically as $$I = \alpha \cdot C_{final} + (1-\alpha) \cdot B$$

In the formula above, $C_{final}$ represents the result of the color decontamination method with texture preserving refinement and final blending as described above, B represents a new background image with which the foreground of $C_{final}$ will be composited, α represents the alpha matte for the input image that was used to generate $C_{final}$ and I represents the composited image.

Figure 9:
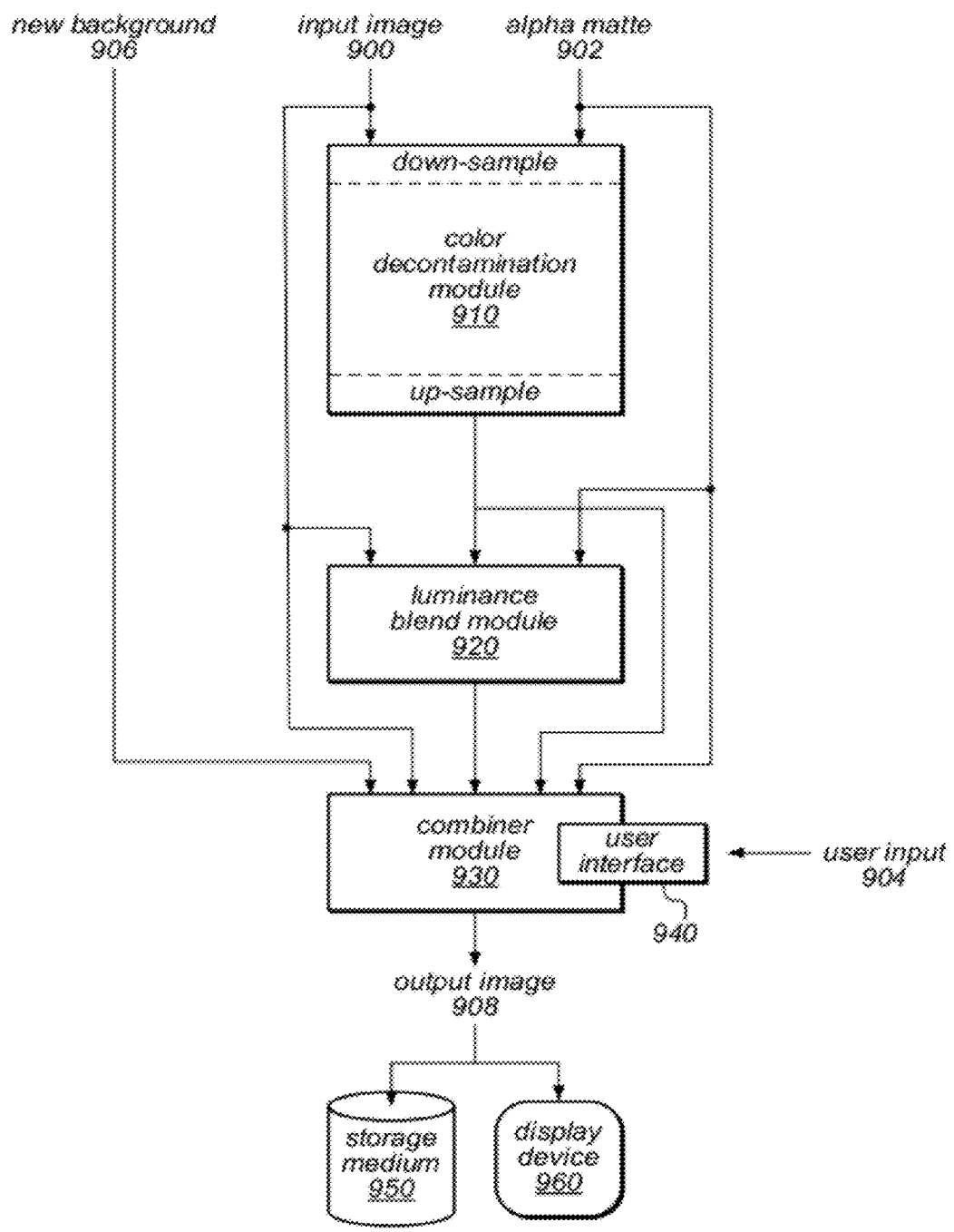
FIG. 9 illustrates modules implementing color decontamination for image compositing, according to some embodiments.

Some embodiments of the present invention may include a means for implementing color decontamination for image compositing as described herein. For example, a toolkit, application or library may include one or more modules for color decontamination of images. An example set of modules is illustrated in FIG. 9. Color decontamination module 910 may implement the color decontamination technique as illustrated in FIG. 3. Luminance blend module 920 may implement a pixel-wise luminance blending texture refinement as described above. Combiner module 930 may perform the final combination of versions of an image as described above and may further provide user interface 940 to accept user input 904 controlling the final blending and creation of a composite image. User interface 940 may, in some embodiments, comprise a slider control as illustrated in FIG. 8A. Alternative, some embodiments may provide other configurations of modules for performing the functionality described herein. The module(s) may in some embodiments be implemented by a computer-readable storage medium and one or more processors (e.g., CPUs) of a computing apparatus.

FIG. 9 illustrates a set of modules that may generate color decontaminated images for compositing. Color decontamination module 910 may access input image 900 and alpha matte 902 as in step 300 of FIG. 3, and may implement determining estimated foreground colors for pixels in the border region of image 900 as in steps 310 and 320 of FIG. 3. In some embodiments, color decontamination module 910 may also perform down-sampling of input image 900 and alpha matte 902 as well as an up-sampling operation after determining estimated foreground colors for pixels in the border region of the image. In some embodiments, luminance blend module 920 may access color decontaminated pixels (i.e. the estimated foreground colors for pixels in the border region of input image 900) as well as input image 900 and alpha matte 902, generating pixels in the border region with a luminance blending texture preserving refinement as described above. Combiner module 930 may access input image 900, color decontaminated pixels (output from color decontamination module 910) and luminance blended pixels (output from luminance blend module 920), and combine them with new background 906 to generate output image 908. In some embodiments, combiner module 930 may also receive user input 904, through user interface 940, setting parameters for combining the images. Output image 908 may, in some embodiments, be stored to a storage medium 950, such as system memory, a disk drive, DVD, CD, etc. Instead, or in addition, output image 908 may be displayed to a display device 960. In some embodiments, combiner module 930 may store or display an image comprising a combination of one or more of input image 900, the output of color decontamination module 910 and the output of luminance blend module 920 (i.e. an image corresponding to $C_{final}$ as described above) without combining a new background image. In some embodiments, input image 900, color decontaminated image 904 and luminance blended image 906 may be individually stored to a storage medium 950 or displayed to a display device 960.

Example System

Figure 10:
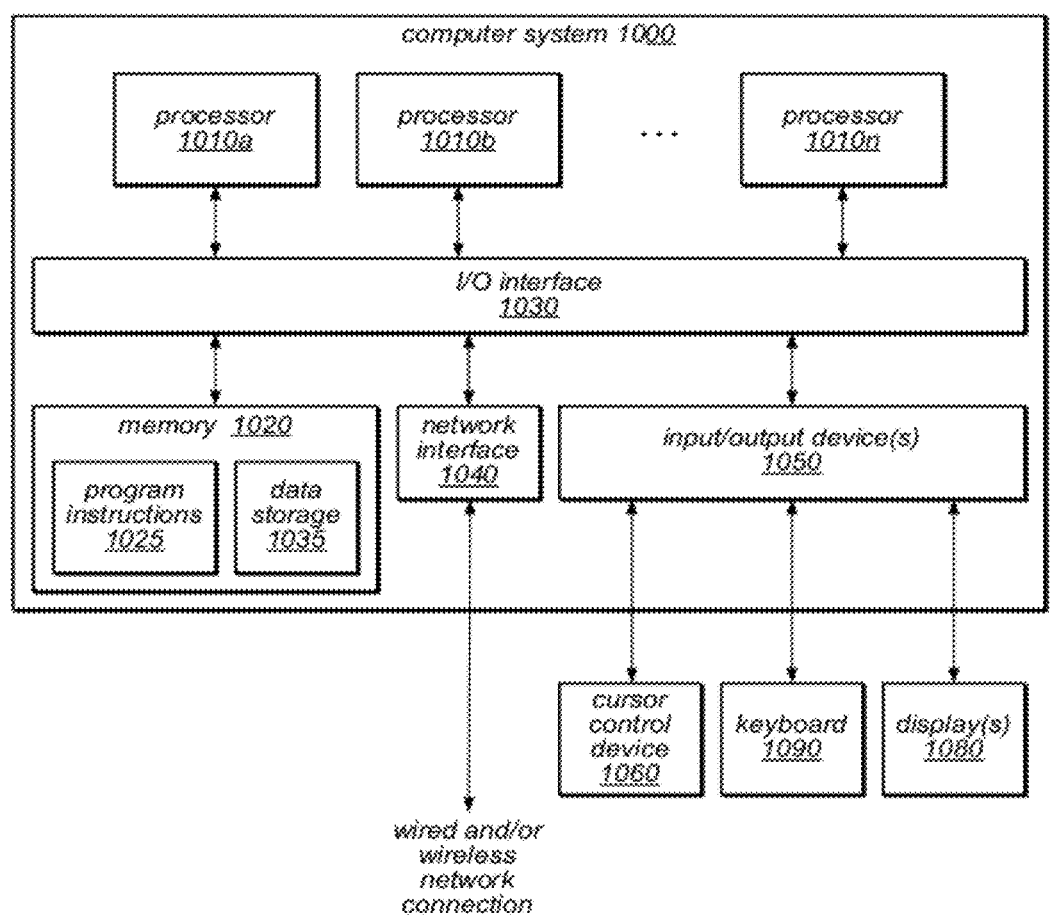
FIG. 10 illustrates an example system capable of implementing color decontamination for image compositing, according to some embodiments.

Various components of embodiments of a color decontamination method as described herein may be executed on one or more computer systems, which may interact with various other devices. One such computer system is illustrated by FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1090, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for color decontamination for image compositing may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for color decontamination for image compositing, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a color decontamination method as described herein, and data storage 1035, comprising various data accessible by program instructions 1025. In one embodiment, program instructions 1025 may include software elements of a color decontamination method illustrated in the above Figures. Data storage 1035 may include data that may be used in embodiments, for example input PDF documents or output layout-preserved text documents. In other embodiments, other or different software elements and/or data may be included.

Those skilled in the art will appreciate that computer system 1000 is merely illustrative and is not intended to limit the scope of a color decontamination method as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
  performing by a computer:
    accessing a data representation of an input image and an alpha matte corresponding to the input image, wherein for each pixel in the input image the alpha matte indicates whether the pixel is a foreground pixel, is a background pixel, or is a transition pixel between foreground and background, wherein the transition pixels form a border region between the foreground and the background;
    for a band of the border region within a distance threshold of a foreground boundary of the border region, determining an estimated foreground color for each pixel within the band, wherein said determining is based on a current color of the pixel and on color values of pixels within a neighborhood distance of the pixel for which foreground colors or estimated foreground color are known;
    repeating said determining one or more times for one or more successive bands of the border region, wherein each successive band is further from the foreground boundary than the previous band; and
    creating a composite image based on the foreground pixels of the input image, the estimated foreground colors for the transition pixels, a new background image, and the alpha matte.

2. The method of claim 1, further comprising:
  down-sampling a higher resolution image to generate the input image; and
  up-sampling at least a portion of the image with pixels having estimated foreground colors for use in creating said composite.

3. The method of claim 1, wherein the alpha matte comprises alpha values corresponding to the transition pixels, wherein each alpha value indicates the relative contribution of the foreground and the background to a respective pixel of the input image, and wherein said determining an estimated foreground color for each pixel comprises:
  combining the current color of the pixel and a composite foreground color value using the alpha value corresponding to the pixel, wherein the composite foreground color value is based on the colors of pixels within the neighborhood distance of the pixel for which foreground colors or estimated foreground colors are known, and wherein the current color value and the composite foreground color are weighted for said combining based on the alpha value corresponding to the pixel.

4. The method of claim 3, wherein the composite foreground color value comprises a weighted average, wherein for each of the pixels within the neighborhood distance of the pixel for which foreground colors or estimated foreground colors are known a respective weight for the weighted average is based on:

a difference in color between the color of the pixel and a foreground color or an estimated foreground color of the pixel within the neighborhood distance; and a difference between the alpha value corresponding to the pixel and an alpha value of the pixel within the neighborhood distance.

5. The method of claim 1, wherein the alpha matte comprises alpha values corresponding to the transition pixels, wherein each alpha value indicates the relative contribution of the foreground and the background to a respective pixel of the input image, the method further comprising:

for each transition pixel, generating a refined foreground color using the alpha value corresponding to the transition pixel, a luminance of a color of the transition pixel in the input image and a luminance of an estimated foreground color of the transition pixel, and wherein the luminance of the color of the transition pixel in the input image and the luminance of the estimated foreground color of the transition pixel are weighted for said generating based on the alpha value corresponding to the pixel.

6. The method of claim 5, wherein said creating a composite image is further based on the refined foreground colors for the transition pixels.

7. The method of claim 6, wherein said creating a composite image is based on one or more parameters adjustable in response to input through a user interface, wherein the one or more parameters control the relative contributions of the input image, the estimated foreground colors for the transition pixels, and the refined foreground colors for the transition pixels.

8. A system, comprising:
at least one processor; and
a memory comprising program instructions that when executed by the at least one processor cause the at least one processor to:
access a data representation of an input image and an alpha matte corresponding to the input image, wherein for each pixel in the input image the alpha matte indicates whether the pixel is a foreground pixel, is a background pixel, or is a transition pixel between foreground and background, wherein the transition pixels form a border region between the foreground and the background;
for a band of the border region within a distance threshold of a foreground boundary of the border region, determine an estimated foreground color for each pixel within the band, wherein said determine an estimated foreground color is based on a current color of the pixel and on color values of pixels within a neighborhood distance of the pixel for which foreground colors or estimated foreground color are known;
repeat said determine an estimated foreground color for each pixel within one or more successive bands of the border region, wherein each successive band is further from the foreground boundary than the previous band; and
create a composite image based on the foreground pixels of the input image, the estimated foreground colors for transition pixels, a new background image, and the alpha matte.

9. The system of claim 8, wherein the program instructions when executed by the at least one processor further cause the at least one processor to:
down-sample a higher resolution image to generate the input image; and
up-sample at least a portion of the image with pixels having estimated foreground colors for use in creating said composite.

10. The system of claim 8, wherein the alpha matte comprises alpha values corresponding to the transition pixels, wherein each alpha value indicates the relative contribution of the foreground and the background to a respective pixel of the input image, and wherein to determine an estimated foreground color for each pixel the program instructions when executed by the at least one processor cause the at least one processor to:
combine the current color of the pixel and a composite foreground color value using the alpha value corresponding to the pixel, wherein the composite foreground color value is based on the colors of pixels within the neighborhood distance of the pixel for which foreground colors or estimated foreground colors are known, and wherein the current color value and the composite foreground color are weighted for said combining based on the alpha value corresponding to the pixel.

11. The system of claim 10, wherein the composite foreground color value comprises a weighted average, wherein for each of the pixels within the neighborhood distance of the pixel for which foreground colors or estimated foreground colors are known a respective weight for the weighted average is based on:
a difference in color between the color of the pixel and a foreground color or an estimated foreground color of the pixel within the neighborhood distance; and
a difference between the alpha value corresponding to the pixel and an alpha value of the pixel within the neighborhood distance.

12. The system of claim 8, wherein the alpha matte comprises alpha values corresponding to the transition pixels, wherein each alpha value indicates the relative contribution of the foreground and the background to a respective pixel of the input image, and wherein the program instructions when executed by the at least one processor further cause the at least one processor to:
for each transition pixel, generate a refined foreground color using the alpha value corresponding to the transition pixel, a luminance of a color of the transition pixel in the input image and a luminance of an estimated foreground color of the transition pixel, and wherein the luminance of the color of the transition pixel in the input image and the luminance of the estimated foreground color of the transition pixel are weighted for said generating based on the alpha value corresponding to the pixel.

13. The system of claim 12, wherein the composite image is further based on refined foreground colors for transition pixels.

14. The system of claim 13, wherein said create a composite image is based on one or more parameters adjustable in response to input through a user interface, wherein the one or more parameters control the relative contributions of the input image, the estimated foreground colors for the transition pixels, and the refined foreground colors for the transition pixels.

15. A non-transitory computer-readable storage medium storing program instructions that when executed by a computing device perform:
accessing a data representation of an input image and an alpha matte corresponding to the input image, wherein for each pixel in the input image the alpha matte indicates whether the pixel is a foreground pixel, is a background pixel, or is a transition pixel between foreground and background, wherein the transition pixels form a border region between the foreground and the background;

for a band of the border region within a distance threshold of a foreground boundary of the border region, determining an estimated foreground color for each pixel within the band, wherein said determining is based on a current color of the pixel and on color values of pixels within a neighborhood distance of the pixel for which foreground colors or estimated foreground color are known;

repeating said determining one or more times for one or more successive bands of the border region, wherein each successive band is further from the foreground boundary than the previous band; and creating a composite image based on the foreground pixels of the input image, the estimated foreground colors for the transition pixels, a new background image, and the alpha matte.

16. The non-transitory computer-readable storage medium of claim 15, wherein the program instructions when executed by the computing device further perform:

down-sampling a higher resolution image to generate the input image; and up-sampling at least a portion of the image with pixels having estimated foreground colors for use in creating said composite.

17. The non-transitory computer-readable storage medium of claim 15, wherein the alpha matte comprises alpha values corresponding to the transition pixels, wherein each alpha value indicates the relative contribution of the foreground and the background to a respective pixel of the input image, and wherein the program instructions when executed by the computing device further perform:

combining the current color of the pixel and a composite foreground color value using the alpha value corresponding to the pixel, wherein the composite foreground color value is based on the colors of pixels within the neighborhood distance of the pixel for which foreground colors or estimated foreground colors are known, and wherein the current color value and the composite foreground color are weighted for said combining based on the alpha value corresponding to the pixel.

18. The non-transitory computer-readable storage medium of claim 17, wherein the composite foreground color value comprises a weighted average, wherein for each of the pixels within the neighborhood distance of the pixel for which foreground colors or estimated foreground colors are known a respective weight for the weighted average is based on:

a difference in color between the color of the pixel and a foreground color or an estimated foreground color of the pixel within the neighborhood distance; and a difference between the alpha value corresponding to the pixel and an alpha value of the pixel within the neighborhood distance.

19. The non-transitory computer-readable storage medium of claim 15, wherein the alpha matte comprises alpha values corresponding to the transition pixels, wherein each alpha value indicates the relative contribution of the foreground and the background to a respective pixel of the input image, and wherein the program instructions when executed by the computing device further perform:

for each transition pixel, generating a refined foreground color using the alpha value corresponding to the transition pixel, a luminance of a color of the transition pixel in the input image and a luminance of an estimated foreground color of the transition pixel, and wherein the luminance of the color of the transition pixel in the input image and the luminance of the estimated foreground color of the transition pixel are weighted for said generating based on the alpha value corresponding to the pixel.

20. The non-transitory computer-readable storage medium of claim 19, wherein creating a composite image is further based on refined foreground colors for transition pixels.

* * * * *